United States Patent [19]

Sanner

[11] Patent Number: 4,909,946
[45] Date of Patent: Mar. 20, 1990

[54] DEWATERING AID FOR CLAY

[75] Inventor: James W. Sanner, Midland, Mich.

[73] Assignee: The Dow Chemical Company, Midland, Mich.

[21] Appl. No.: 943,838

[22] Filed: Dec. 5, 1986

Related U.S. Application Data

[63] Continuation of Ser. No. 744,831, Jun. 14, 1985, abandoned.

[51] Int. Cl.$^4$ .............................................. B01D 37/02
[52] U.S. Cl. .................................... 210/728; 210/734; 210/778; 209/5; 501/148
[58] Field of Search .................. 106/288 B; 209/5; 210/725, 727, 728, 732, 733, 734, 778; 501/148

[56] References Cited

U.S. PATENT DOCUMENTS

| | | | |
|---|---|---|---|
| 3,418,237 | 12/1968 | Booth et al. | 210/734 |
| 3,479,282 | 11/1969 | Chamot et al. | 210/734 |
| 3,479,284 | 11/1969 | Lees | 210/734 |
| 3,578,586 | 5/1971 | Gal et al. | 210/725 |
| 3,837,482 | 9/1974 | Sheridan | 209/5 |
| 4,045,235 | 8/1977 | Bidwell et al. | 210/716 |
| 4,174,279 | 11/1979 | Clark et al. | 209/5 |

FOREIGN PATENT DOCUMENTS

| | | | |
|---|---|---|---|
| 0047118 | 3/1982 | European Pat. Off. | 210/778 |
| 53-106685 | 9/1978 | Japan | 210/734 |

*Primary Examiner*—Peter Hruskoci
*Attorney, Agent, or Firm*—Charles J. Enright

[57] ABSTRACT

Water can be removed from an aqueous clay slurry using techniques such as filtration wherein the slurry is contacted with an anionic polymer having a molecular weight in the range from about 3,000 to about 1,000,000. The water is removed from the slurry at a rapid rate in order to provide a clay cake.

6 Claims, No Drawings

DEWATERING AID FOR CLAY

Cross-Reference to Related Application This is a continuation of application Ser. No. 744,831 filed June 14, 1985, now abandoned.

BACKGROUND OF THE INVENTION

This invention relates to the processing of clay, and in particular, to the dewatering of clay during the processing thereof.

Clays are useful in a variety of applications, such as those where filler materials are desirable. Typically, clays are defined as fine, irregularly shaped crystals of hydrated aluminum silicates. For example, clays are useful in coating applications as taught in U.S. Pat. No. 4,474,860; and as additives as taught in U.S. Pat. No. 4,500,670.

The processing of clays requires that small sized clay particles (e.g., from about 1 $\mu$m or less to about 150 $\mu$m) be provided in an aqueous medium in order to provide a slurry. The slurry is treated as described in *Encyclopedia of Chemical Technology*, Vol. 4, p. 62, Interscience, ed. by Kirk-Othmer (1949). After treatment, it is desirable to remove the water from the clay. Typically, the slurry is filtered and the clay is provided in the form of a cake. The dewatered cake is then employed or reslurried for further use.

Unfortunately, the dewatering of clays requires lengthy and costly filtration steps. For example, high molecular weight flocculants can be employed during dewatering processes. Unfortunately, even though rapid dewatering of the clays can be achieved, the amounts of clay solids which are present in the slurries are very low. In addition, low molecular weight dispersants can be employed in order to provide high clay solids containing slurries. Unfortunately, such slurries filter very poorly.

In view of the aforementioned deficiencies, it is highly desirable to provide an improved process for dewatering clays.

SUMMARY OF THE INVENTION

The present invention is a process for removing water from an aqueous clay slurry, thus providing a substantially dry cake, said process comprising (1) contacting said slurry with a functionally effective amount of a low molecular weight water-soluble polymer comprised of polymerized nonionic monomers and monomers having an anionic character and (2) subjecting said slurry to water removal conditions.

The process of this invention provides the skilled artisan with an improved means for dewatering clays. In particular, the process of this invention provides the skilled artisan with a means for quickly providing a high solids cake of clay during, for example, a slurry filtration and dewatering process. In addition, the process of this invention allows the skilled artisan to provide clay samples which do not exhibit increased viscosity upon reslurry steps. Furthermore, the slurry which is provided does not exhibit significant dilatant properties.

DETAILED DESCRIPTION OF THE INVENTION

Clays which are employed in the process of this invention are those which can be slurried in an aqueous medium and filtered in order to provide a cake. Typically, clay particles which have sizes ranging from less than about 1 $\mu$m to about 150 $\mu$m are employed. Clay slurries which are provided typically comprise from about 10 to about 40, preferably about 15 to about 25 weight percent clay solids and from about 60 to about 90, preferably about 75 to about 85 weight percent aqueous liquid. Examples of typical clays include sodium bentonite, kaolinite and attapulgite, serpentines, illites, etc.

The low molecular weight water-soluble polymer of this invention can vary. For purposes of this invention, a water-soluble polymer is one which forms a thermodynamically stable mixture when combined with water. These mixtures form spontaneously and include true solutions in which the individual polymer molecules are dispersed as well as micellar or colloidal solutions wherein the polymer molecules are aggregates and are no larger than colloidal size. Accordingly, such water-soluble polymers are generally copolymers of ethylenically unsaturated monomers.

Examples of nonionic monomers include acrylamide, methacrylamide, fumaramide, and the like.

The ionic monomers can be anionic. Examples of anionic monomers include acrylic acid, methacrylic acid, itaconic acid, 2-acrylamido-2-methylpropane sulfonic acid, vinyl benzyl sulfonic acid, fumaric acid, and the like; and salts thereof. Polymers of polymerized acrylamide can be hydrolyzed to yield anionic moieties.

The relative amounts of polymerized nonionic monomer relative to the anionic monomer can vary. Typically, the amount of anionic monomer ranges from about 1 to about 80, preferably from about 30 to about 50 weight percent, while the amount of nonionic monomer ranges from about 20 to about 99, preferably from about 50 to about 70 weight percent, based on total amounts of monomer polymerized. Generally, less ionic mer units are required in a polymer which is hydrolyzed as compared to a polymer provided by the polymerization of anion monomers. Typically, the amount of ionic monomer relative to nonionic monomer in the polymer is that amount which is low enough in order to provide a polymer having a dispersing character; and high enough in order to provide an efficient dispersing character. Most preferably, a polymer having a dispersing character is that polymer and amount of polymer which provides enough anionic charge to effectively neutralize about one-half of the edge (i.e., the positive charge character) charge of the clay particles.

The polymer is a low molecular weight polymer. By this is meant that the polymer does not provide a substantial increase in viscosity of an aqueous clay slurry under typical processing conditions. Typical molecular weights range from about 3,000 to about 1,000,000, preferably from about 300,000 to about 600,000.

The functionally effective amount of polymer which is employed in the process of this invention can vary. The amount of polymer is that amount which reduces the filter time of a clay slurry by greater than 0 to about 50 percent over a clay slurry which is filtered without employing the low molecular weight water-soluble polymer of this invention. Besides providing a reduction in filter time, the functionally effective amount of polymer provides the ability to filter slurries having comparable amounts of clay solids to slurries not containing the low molecular weight water-soluble polymer of this invention; while providing a filter cake having similar properties to a cake provided upon filtration of a slurry not containing the low molecular weight water-soluble polymer of this invention. The upper limit of the functionally effective amount of polymer is generally set by the point of clay stabilization. For example, it is desirable to not employ so much polymer as to block off filter efficiency (i.e., that amount of polymer which provides small particulates which block the filter apparatus, thus providing overly long filter times). Thus, it is desirable to employ that amount of polymer which provides a porous, permeable filter cake. The lower limit of the functionally effective amount of polymer is generally set by the point at which faster filtration rates occur. The upper limit of the amount of polymer which is employed is that amount which is less than the clay stability load range at which an undesirable increase in cake formation time occurs. Typical amounts of polymer range from greater than 0 to less than about 1, preferably from about 0.01 to about 0.3, more preferably about 0.05 to about 0.1, weight percent based on the weight of the clay solids which are treated.

The polymer is contacted with the slurry using a variety of techniques. Typically, the polymer is provided as in the form of an aqueous solution. The slurry is then subjected to drying conditions by performing processes such as filtering the slurry. Examples of filtration techniques include employing filter presses or rotary vacuum drying dryers. Typical filtration techniques are described in *Encyclopedia of Chemical Technology*, Vol. 4, p. 62 and Vol. 6, pp 506–530, Interscience, ed. by Kirk-Othmer (1949).

If desired, the process of this invention can include the utilization of aluminum ions (e.g., as aluminum sulfate) in an amount sufficient to further improve the filtration rate of the clay slurry. Typically, the amount of aluminum ion ranges from about 1 to about 1,000, preferably about 100 ppm, based on clay solids.

The filtered clay or cake which is provided using the process of this invention is provided in a substantially dry form in a substantially faster time than occurs for a slurry which is dewatered using conventional procedures. The amount of solids present in the cake ranges from about 35 to about 65 percent. In addition, the clay so provided can be readily reslurried in water in order to prevent a slurry having good properties. For example, a clay sample which is provided using the process of this invention can be reslurried in water, which over time exhibits a viscosity which remains substantially constant and does not exhibit a significant increase, if any, in viscosity. If desired, the cake so formed can be further dried using the application of heat and/or vacuum conditions.

The following example is provided to further illustrate the invention but not limit its scope. All parts and percentages are given by weight unless otherwise indicated.

EXAMPLE 1

A polymer having an anionic character is provided by providing acrylamide monomer as a 23 percent solution in deionized water, contacting the solution with 3,000 ppm of sodium persulfate and 3,000 ppm sodium metabisulfite (both amounts based on monomer). The mixture is heated at 80° C. for about 2 hours. The resulting polymer is hydrolyzed by adding to the reaction mixture (which contains 710 g of 23 percent solution of polyacrylamide) 72 g of a 50 percent aqueous sodium hydroxide solution, and reacting the mixture at 60° C. for 2 hours. The resulting polymer has a molecular weight of from 300,000 to 500,000 and is 59 percent polymerized acrylamide and 41 percent polymerized sodium acrylate. The polymer is designated as Polymer A.

In a similar manner is provided a polymer comprising 59 percent polymerized acrylamide and 41 percent polymerized sodium acrylate, and having a molecular weight of about 50,000. The polymer is designated as Polymer B.

In a similar manner is provided a polymer comprising 41 percent polymerized sodium acrylate and 59 percent polymerized acrylamide and having a molecular weight of about 5,000. The polymer is designated as Polymer C.

In 50 ml of deionized water, various amounts of an aqueous solution containing 5 percent of the previously described polymer, and 0.2 ml of 1N sulfuric acid is slurried 25 g of a 62 percent solids clay filter cake using a Waring Blender at high speed for 1 minute. The jar is scraped and the mixture is slurried again for 1 minute. The slurry is poured on a 7 cm diameter buchner funnel using #1 Whatman filter paper. The filtration apparatus is employed under vacuum conditions using a water aspirator. The time required to obtain a cake having a surface which appears dry is determined. Data is presented in Table I.

TABLE I

| Amount of Polymer Employed (Percent Based on Clay) | Filter Rate in Seconds For Polymer | | |
|---|---|---|---|
| | Polymer A | Polymer B | Polymer C |
| 0.03 | 440 | 500 | 580 |
| 0.0781 | 300 | 540 | 740 |
| 0.1560 | 290 | 660 | 1,000 |
| 0.2343 | 600 | 1,000 | 71,000 |

The data in Table I illustrate that the filter rate of the slurry depends upon the amount of polymer employed and the molecular weight of the polymer employed. For comparison purposes a slurry not containing any polymer exhibits a filter rate of 660 seconds.

What is claimed is:

1. A process for removing water from an aqueous clay slurry, thus providing a substantially dry cake, said process comprising (1) contacting said slurry containing solids consisting essentially of clay with a functionally effective amount of a water-soluble polymer having a molecular weight of from about 3,000 to about 1,000,000 comprised of polymerized acrylamide and salts of acrylic acid and (2) subjecting said slurry to water removal conditions.

2. The process of claim 1 wherein said polymer has a molecular weight of from about 300,000 to about 600,000.

3. The process of claim 1 which further comprises contacting said slurry with an amount of aluminum ions sufficient to further improve a filtration rate of the clay slurry which is contacted with said water-soluble polymer.

4. The process of claim 1 wherein the amount of polymer ranges from greater than 0 to less than about 1 weight percent based on the weight of clay solids in said slurry.

5. The process of claim 1 wherein said polymer comprises in polymerized form an amount of a salt of acrylic acid in the range from about 1 to about 80 weight percent and an amount of acrylamide from about 20 to about 99 weight percent.

6. The process of claim 1 wherein said polymer comprises in polymerized form an amount of a salt of acrylic acid in the range from about 30 to about 50 weight percent and an amount of acrylamide from about 50 to about 70 weight percent.

* * * * *